(12) United States Patent
Mak

(10) Patent No.: US 9,134,809 B1
(45) Date of Patent: Sep. 15, 2015

(54) BLOCK-BASED NAVIGATION OF A VIRTUAL KEYBOARD

(75) Inventor: Mingchi Stephen Mak, Mountain View, CA (US)

(73) Assignee: Amazon Technologies Inc., Reno, NV (US)

( * ) Notice: Subject to any disclaimer, the term of this patent is extended or adjusted under 35 U.S.C. 154(b) by 446 days.

(21) Appl. No.: 13/052,948

(22) Filed: Mar. 21, 2011

(51) Int. Cl.
  *G06F 3/02* (2006.01)
  *G06F 3/042* (2006.01)
  *G06F 3/0488* (2013.01)

(52) U.S. Cl.
  CPC ............ *G06F 3/0221* (2013.01); *G06F 3/0426* (2013.01); *G06F 3/04886* (2013.01)

(58) Field of Classification Search
  CPC .. G06F 3/0221; G06F 3/0426; G06F 3/04886
  USPC .................................................. 345/173, 168
  See application file for complete search history.

(56) References Cited

U.S. PATENT DOCUMENTS

| | | | | |
|---|---|---|---|---|
| 5,956,021 A * | 9/1999 | Kubota et al. | ................. | 345/173 |
| 6,169,538 B1 * | 1/2001 | Nowlan et al. | ................. | 345/173 |
| 6,271,835 B1 * | 8/2001 | Hoeksma | ..................... | 345/168 |
| 6,292,179 B1 * | 9/2001 | Lee | ............... | 345/173 |
| 6,295,052 B1 * | 9/2001 | Kato et al. | .................... | 345/173 |
| 6,765,554 B2 * | 7/2004 | Millington | .................... | 345/156 |
| 7,088,340 B2 * | 8/2006 | Kato | ............................ | 345/168 |
| 8,319,742 B2 * | 11/2012 | Doktorova et al. | ........... | 345/173 |
| 2004/0104896 A1 * | 6/2004 | Suraqui | ......................... | 345/168 |
| 2004/0135823 A1 * | 7/2004 | Wingett et al. | ............... | 345/856 |
| 2006/0119582 A1 * | 6/2006 | Ng et al. | ....................... | 345/173 |
| 2006/0129541 A1 * | 6/2006 | Morgan et al. | .................... | 707/3 |
| 2006/0282791 A1 * | 12/2006 | Bogomolov et al. | ......... | 345/168 |
| 2007/0046641 A1 * | 3/2007 | Lim | ............................... | 345/173 |
| 2007/0127716 A1 * | 6/2007 | Lee et al. | .......................... | 380/43 |
| 2007/0152980 A1 * | 7/2007 | Kocienda et al. | ............. | 345/173 |
| 2008/0042983 A1 * | 2/2008 | Kim et al. | ..................... | 345/173 |
| 2008/0072143 A1 * | 3/2008 | Assadollahi | ................... | 715/261 |
| 2008/0158162 A1 * | 7/2008 | Ahn | ............................... | 345/168 |
| 2008/0180403 A1 * | 7/2008 | Park et al. | ..................... | 345/173 |
| 2008/0284744 A1 * | 11/2008 | Park et al. | ...................... | 345/173 |
| 2008/0291171 A1 * | 11/2008 | Shin et al. | ...................... | 345/173 |
| 2009/0193361 A1 * | 7/2009 | Lee et al. | ....................... | 715/810 |
| 2009/0262082 A1 * | 10/2009 | Park et al. | ...................... | 345/171 |
| 2009/0295750 A1 * | 12/2009 | Yamazaki et al. | ............. | 345/173 |
| 2010/0164879 A1 * | 7/2010 | Doktorova et al. | ........... | 345/173 |
| 2010/0171700 A1 * | 7/2010 | Sharan et al. | ................. | 345/168 |
| 2012/0169606 A1 * | 7/2012 | Xia | ............................... | 345/168 |

FOREIGN PATENT DOCUMENTS

CN         101650636         *   2/2010   .............. G06F 3/048

* cited by examiner

*Primary Examiner* — Adam J Snyder
(74) *Attorney, Agent, or Firm* — Lee & Hayes, PLLC

(57) ABSTRACT

Some implementations provide a virtual keyboard having a plurality of keys grouped into a plurality of blocks of multiple keys. For instance, a first type of keyboard control input may navigate a focus of the keyboard from a first block of keys to a second block of keys as a shortcut for quickly traversing a number of keys. A second type of keyboard control input may navigate the focus from a first key to an adjacent key. Navigation of the focus to a target block may result in the focus being centrally located within the target block so that the keys in the target block can be accessed with a minimal number of additional control inputs. Further, in some implementations, one or more suggested words maybe displayed based, at least in part, the keys contained within a block in which the focus is currently located.

26 Claims, 13 Drawing Sheets

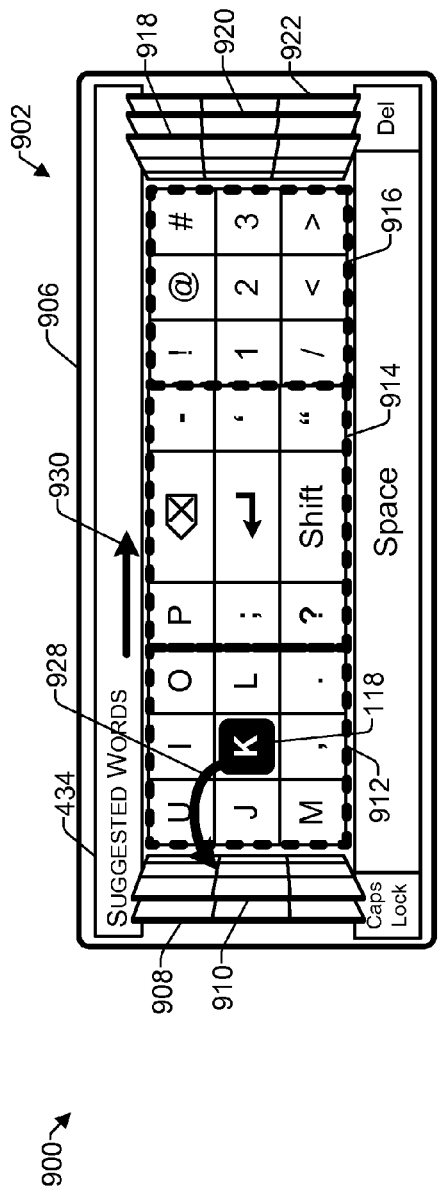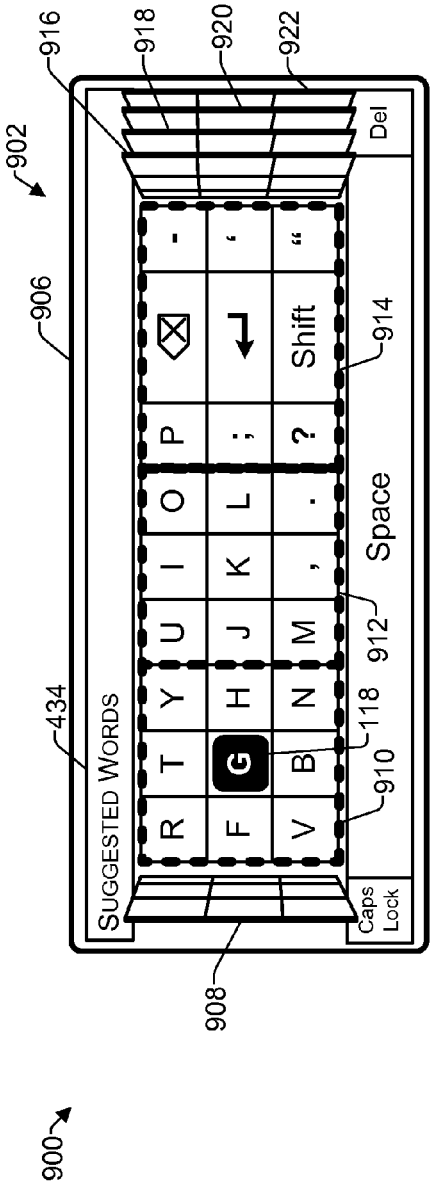

BLOCK-BASED NAVIGATION OF A VIRTUAL KEYBOARD

BACKGROUND

People commonly use electronic devices for consuming digital media content, executing applications and performing various other functions. Examples of such electronic devices may include eBook reader devices, cellular telephones and smart phones, tablet computers, portable media players, netbooks, personal digital assistants, and the like. User interface controls for these devices often include physical keyboards. However, in many devices the physical keyboard is not used frequently enough to justify the additional size and weight that the physical keyboard would add to the device. Accordingly, to reduce the size and weight of a device, rather than having a physical keyboard, the device may present a virtual keyboard on a display screen. For example, the virtual keyboard may be displayed only when needed for entering characters in the user interface of the device, and otherwise may be hidden when not in use. Typically, a user may use navigation controls or buttons to navigate through the keys of the virtual keyboard one-at-a-time to select characters to enter into the user interface.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIGS. 9A-9D illustrate examples of navigating a virtual keyboard having contiguous blocks according to some implementations.

DETAILED DESCRIPTION

Virtual Keyboard Navigation

Figure 1:
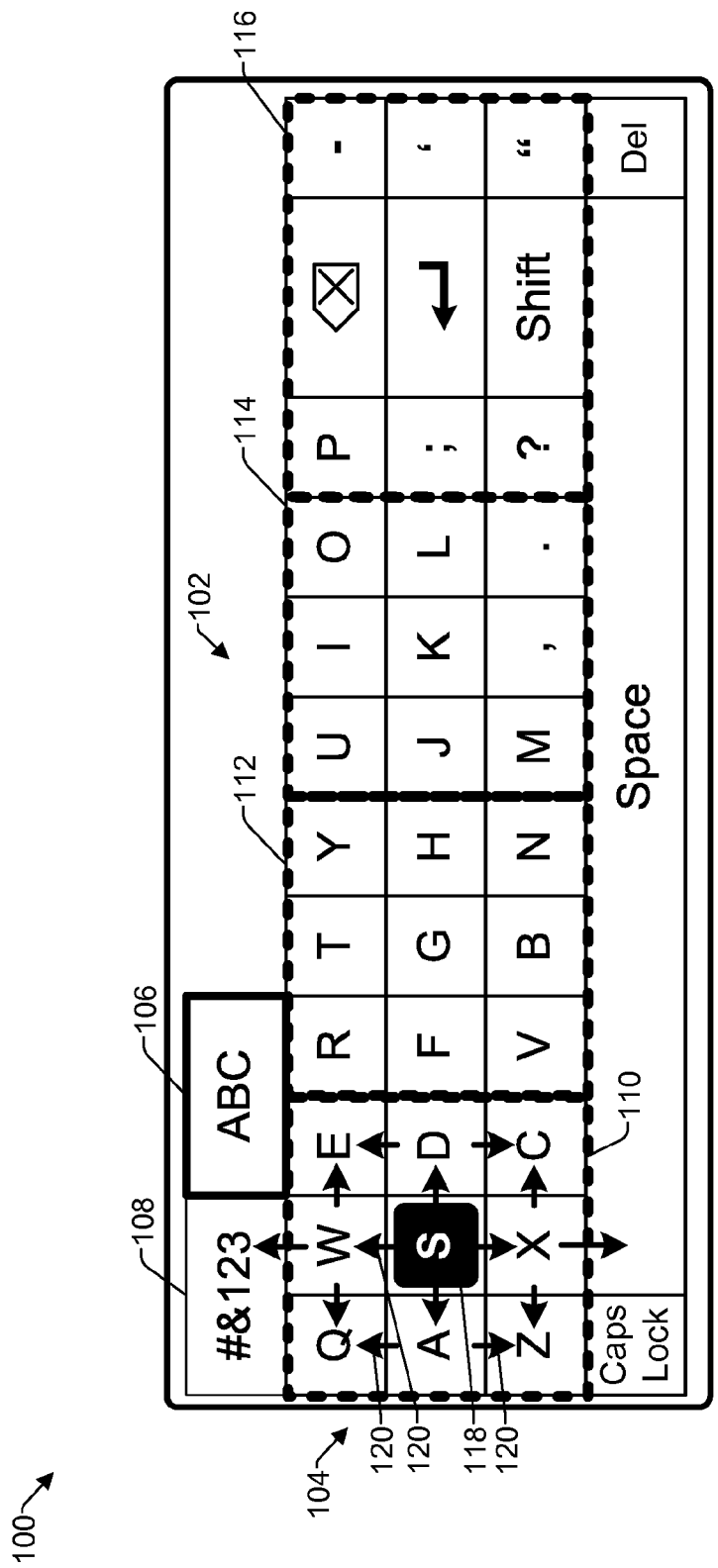
FIG. 1 illustrates an example of navigating a virtual keyboard of an electronic device according to some implementations.

This disclosure includes techniques and arrangements for enabling a user to navigate a virtual keyboard or other virtual representation of multiple selectable elements. In some implementations, the virtual keyboard is displayed on a display of an electronic device. The virtual keyboard may include a plurality of virtual keys, each representing one or more characters (e.g., alphanumeric characters, punctuation marks, symbols, etc.), or one or more functions (e.g., shift, return, backspace, delete, etc.). Further, according to some implementations, the keyboard may be divided in a plurality of blocks of keys. For example, each block may include a subset of the plurality of keys. Thus, each block may be made up of a group of contiguous or adjacently positioned keys, such as 9 keys per block, 12 keys per block, 16 keys per block, and so forth. A user may navigate between the multiple blocks as a navigation shortcut for traversing multiple keys to speed selection of desired keys of the keyboard.

In some implementations, multiple navigation controls provide separate navigation functions for navigating among keys of the virtual keyboard and among blocks of keys. For example, a first navigation control may provide a first type of keyboard control input to control movement of a cursor or focus of the keyboard between the different blocks of the keyboard. A second navigation control may provide a second type of keyboard control input to control navigation of the focus among individual keys of the keyboard, such as from a first key to an adjacent key. In some implementations, the navigation from one block to the next block results in the focus being located in a central position within the next block, so that a minimal number of subsequent navigation operations can be used to reach any key within the block. When the focus is located at a particular desired key, the user may activate a select control as a third type of keyboard control input to select the particular key at which the focus is located. Thus, by enabling a user to navigate quickly between blocks of keys, implementations herein reduce the time required to navigate the virtual keyboard. Accordingly, a user may enter more characters in a shorter period of time than conventional navigation techniques allow.

The techniques and arrangements described herein may apply to a variety of different types of electronic devices, such as eBook reader devices, cellular telephones and smart phones, tablet computers, portable media players, netbooks, desktop computers, laptops, personal digital assistants, televisions, set top boxes, gaming consoles and systems, optical disc players, digital video recorders, and other devices that may display or employ a virtual keyboard. The electronic device may be capable of executing various types of applications and/or consuming, displaying or playing various content items. Examples of applications may include web browsing and web searching applications, games, shopping applications, texting applications, word processing applications, social networking applications, and the like. Further, examples of various content items may include eBooks, still images, videos, audio books, music, maps, and so on. Many of these applications and content items may include instances that utilize the entry of one or more characters from a virtual keyboard.

The foregoing discussion is provided for the reader's convenience and is not intended to limit the scope of the claims or the disclosure herein. Furthermore, the techniques described above and below may be implemented in a number of ways and in a number of contexts. Several example implementations and contexts are provided with reference to the figures, as described below in more detail. However, the following implementations and contexts are but a few of many.

Example Virtual Keyboard

FIG. 1 illustrates an example virtual keyboard 100 according to some implementations. The keyboard 100 includes a layout 102 of a plurality of virtual keys 104 representing various characters, punctuation marks or functions. In the particular example, keys 104 include the letters A-Z of the English alphabet, with one letter per key. Keys 104 also include some common punctuation marks including a period key, a comma key, a semicolon key, a question mark key, a hyphen key, an apostrophe key, and a quotation mark key. Keys 104 also include several function keys, including a backspace key, a return key, a shift key, a delete key, a caps lock key and a spacebar key. Further, portions of the layout 102 of the keys 104 in the keyboard 100 are similar to a standard QWERTY keyboard layout, but this layout 102 is merely one example of a possible layout, with numerous other layouts and key arrangements being possible. Several additional examples of possible layouts are described below.

Keyboard 100 also may include selectable tabs, such as an ABC tab 106 and a symbols-and-numbers (#&123) tab 108. In the illustrated example, the ABC tab 106 is currently selected, resulting in presentation of the layout 102 including the letters of the alphabet being displayed in the keyboard 100. When the user desires to select a number or symbol, the user may select the symbols-and-numbers tab 108 to display a different layout, as described below with respect to FIG. 3, which includes numbers and symbols.

According to some implementations, the keys 104 may be divided into a plurality of blocks (as designated in FIG. 1 by bold dashed lines) to aid in navigating among the keys 104. In the illustrated example, a first block 110 may include nine keys, namely, the Q key, the W key, the E key, the A key, the S key, the D key, the Z key, the X key and the C key. A second block 112 may also include nine keys, namely, the R key, the T key, the Y key, the F key, the G key, the H key, the V key, the B key and the N key. A third block 114 may also include nine keys, namely, the U key, the I key, the O key, the J key, the K key, the L key, the M key, the comma key and the period key. A fourth block 116 may also include nine keys, namely, the P key, the backspace key, the hyphen key, the semicolon key, the return key, the apostrophe key, the question-mark key, the shift key and the quotation-mark key.

In the example of FIG. 1, each block 110-116 may include nine keys, with each block 110-116 having a centrally located key and eight keys adjacent or contiguous to the centrally located key. For example, in the first block 110, the S key is centrally located. Thus, when a focus 118 is located over the S key, the focus 118 may cause the S key to be highlighted or otherwise be distinguishable from the other keys 104. Further, the focus 118 may be navigated from the S key to an adjacent key, such as the Q key, the W key, the E key, the A key, the S key, the D key, the Z key, the X key or the C key using two or fewer navigation actions, as indicated by the arrows 120. For example, in some implementations, to position the focus 118 over the Q key, the user may move the focus 118 up to the W key and then over to the Q key, or the user may move the focus 118 over to the A key and then up to the Q key. Other implementations may enable a single diagonal move of the focus 118 from the S key to the Q key using a single navigation action. Further, to move the focus 118 from the S key to the spacebar key, the user may move the focus down to the X key and then down again to the spacebar key. Similarly, to move the focus from the S key to the symbols-and-numbers tab 108, the user may move the focus from the S key up to the W key, and then up again to the symbols-and-numbers tab 108.

Blocks 112, 114 and 116 also each include a centrally located key. In this example, the G key is centrally located in the second block 112, the K key is centrally located in the third block 114, and the return key is centrally located in the forth block 116. Thus, from the centrally located keys in the blocks 110-116, a user may position the focus 118 on the adjacent other keys in a particular block with one or two navigation actions.

Furthermore, while the blocks in the example of FIG. 1 are distinguished using dashed lines to outline the blocks, in other implementations, the blocks may be visually distinguished using any practical manner. For example, the blocks may each be shaded a slightly different color, alternating blocks may be visually different, or an individual block may be briefly highlighted or increased in brightness when a focus is first placed in the block. Alternatively, a block may remain visually distinguished or highlighted as long as the focus is within the block. Still alternatively, the blocks may be visually distinguished only when the focus is being moved. Additionally, in other implementations, the blocks may not be visually distinguished from one another.

Figure 2:
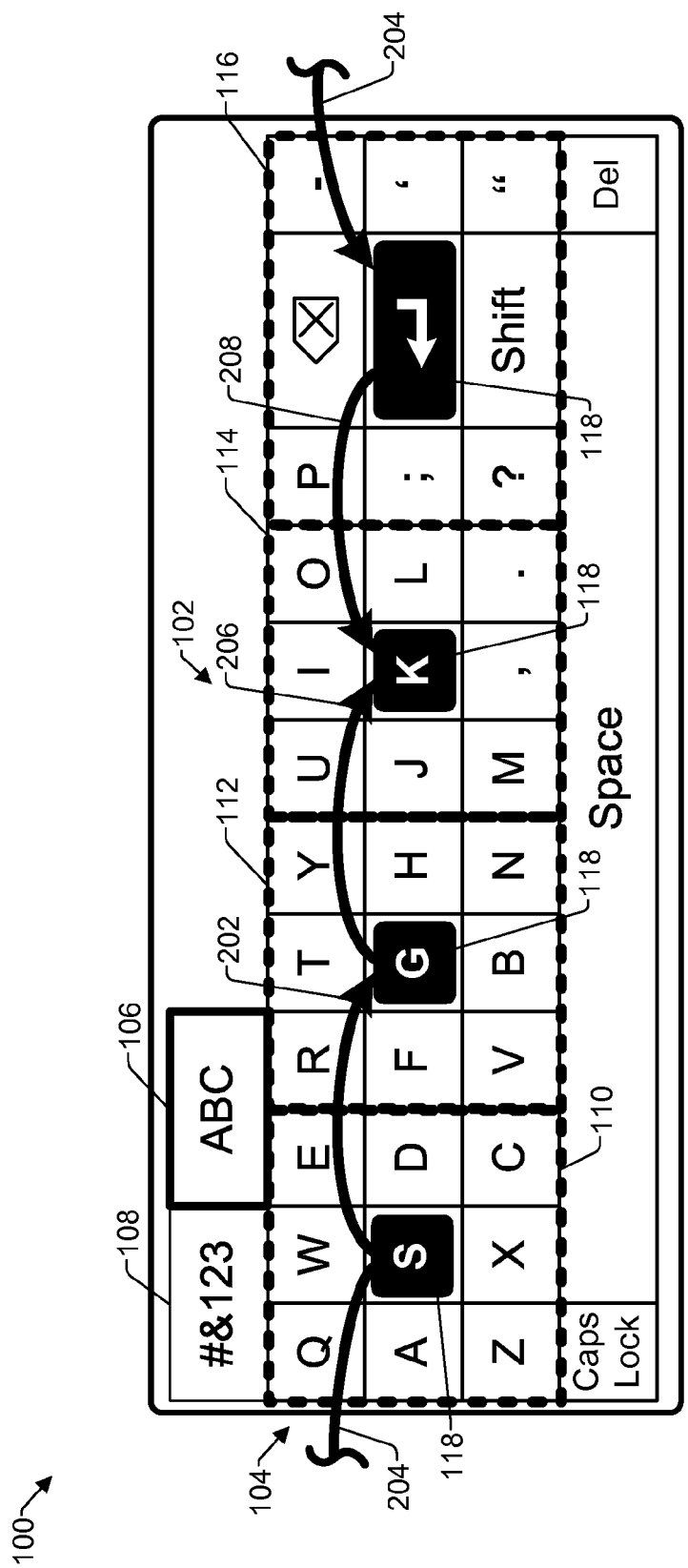
FIG. 2 illustrates navigating between blocks of the virtual keyboard of FIG. 1 according to some implementations.

FIG. 2 illustrates an example of navigating between blocks 110, 112, 114 and 116 of the keyboard 100 of FIG. 1 according to some implementations. For instance, if the focus 118 is on the S key, a user may activate a navigation control (not shown in FIG. 2) to navigate from block 110 to either second block 112 or fourth block 116. Thus, the user may activate the navigation control to move the focus 118 to the right from the first block 110 to second block 112, as indicated by arrow 202, resulting in the focus 118 then being located on the G key, which is a centrally located key of block 112. Alternatively, the user may activate a navigation control to move the focus 118 to the left from first block 110 to fourth block 116, as indicated by arrow 204, resulting in the focus 118 being positioned on the return key, which is centrally located in the forth block 116. Accordingly, in some implementations, the keyboard 100 essentially wraps around so that movement of the focus 118 off an end of the keyboard 100 results in the focus 118 moving onto the opposite end of the keyboard 100 as indicated by arrow 204. Following navigation from block 110 to either second block 112 or fourth block 116, the user may again activate the navigation control in the same direction to navigate to third block 114. For example, from second block 112 the user may navigate to the right as indicated by arrow 206 to place the focus on the K key in third block 114. On the other hand, if the user has navigated to the return key in fourth block 116, an additional navigation to the left as indicated by arrow 208 also results in the focus 118 being located at the K key in block 114. Once the user has located the focus in a desired block 110, 112, 114 or 116, the user may then use a second navigation control (not shown in FIG. 2) to navigate among individual keys of the particular block to place a focus in a desired location, such as by navigating to a particular key as described above with reference to FIG. 1.

Figure 3:
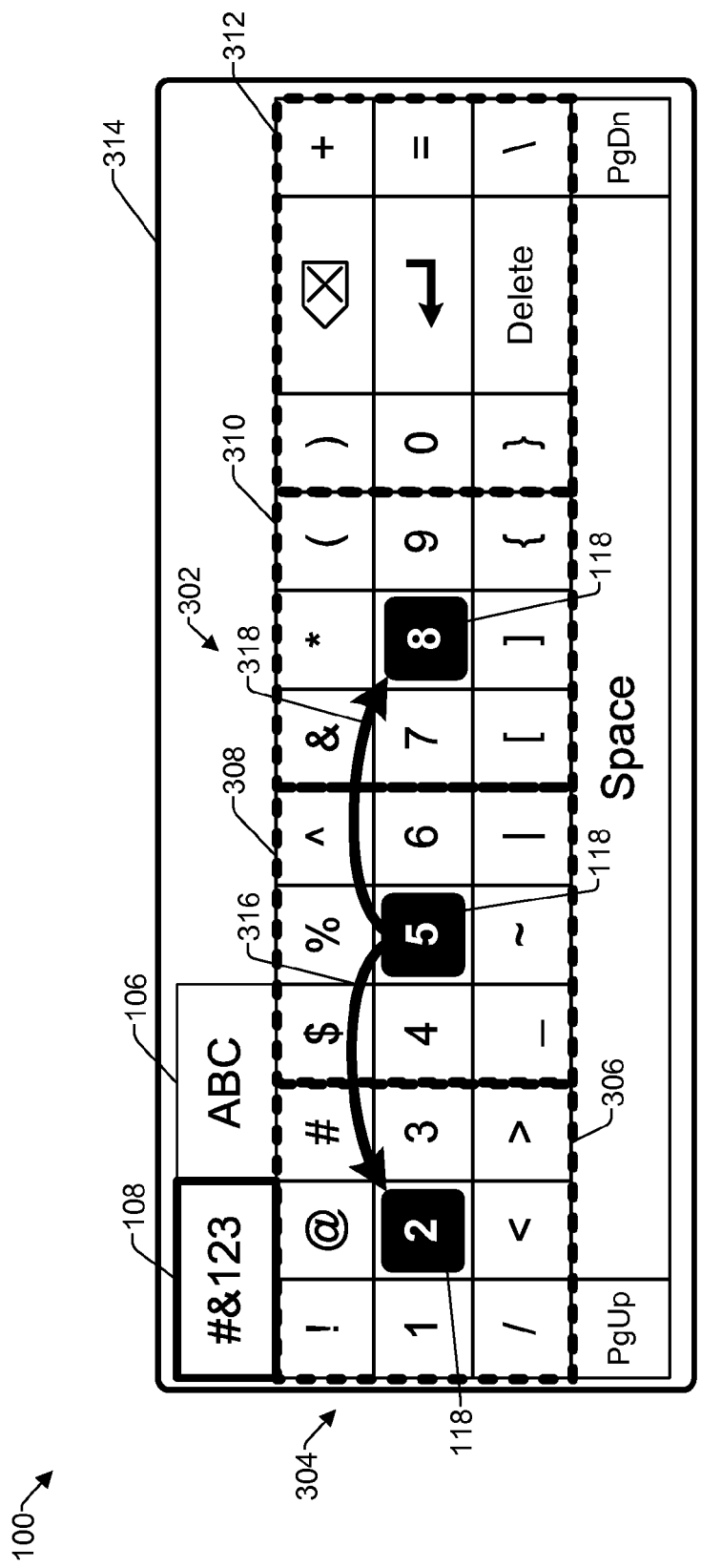
FIG. 3 illustrates navigating between blocks in a second layout of the virtual keyboard of FIG. 1.

FIG. 3 illustrates an example layout 302 of the keyboard 100 when the symbols-and-numbers tab 108 is selected. In some implementations, the user may navigate to the symbols and numbers tab 108 in the manner described above with reference to FIG. 1. Alternatively, a separate navigation function may be provided to enable selection of the tabs 106, 108. Selection of the symbols-and-numbers tab 108 results in the display of the layout 302 having a plurality of virtual keys 304 including numbers 0-9, a plurality of symbols, such as an exclamation point symbol, a number sign symbol, a dollar sign symbol, a percent symbol, an "at" symbol, an ampersand symbol, an asterisk symbol, left and right parentheses symbols, a forward slash, a less-than sign, a greater-than sign, an underscore, a tilde, a vertical line, left and right square brackets, left and right curved brackets, a backslash, an equal sign, and a plus sign. In addition, various functions may be included such as backspace, return, delete, page-up, and page-down.

In the illustrated example, the keys 304 may be divided into multiple blocks of nine keys each. For example, a first block 306 includes the exclamation point key, the "at" symbol key, the number symbol key, the 1 key, the 2 key, the 3 key, the forward slash key, the less-than key, and the greater-than key. A second block 308 includes the dollar sign key, the percent sign key, the hat key, the 4 key, the 5 key, the 6 key, the underscore key, the tilde key, and the vertical line key. A third block 310 includes the ampersand key, the asterisk key, the left parenthesis key, the 7 key, the 8 key, the 9 key, the left square bracket key, the right square bracket key, and the left curved bracket key. The fourth block 312 includes the right parenthesis key, the backspace key, the plus symbol key, the 0 key, the return key, the equal sign key, the right curved bracket key, the delete key and the backslash key. Furthermore, as discussed above with reference to the layout 102 of FIG. 1, the spacebar key may extend across the multiple blocks 306-312 displayed within a keyboard field of view 314 to enable the user to navigate to the spacebar with minimal keyboard control inputs.

When the user selects the symbols-and-numbers tab 108, the layout 302 may be displayed and the focus 118 may be initially centrally located, such as at the center of second block 308 or the center of the third block 310, e.g., on the 5 key or on the 8 key, respectively. In the illustrated example, the focus 118 is initially located on the 5 key, and from there the user may navigate as described above to a particular desired block. For example, if the key that the user desires to select is located in the first block 306 the user may use a keyboard control input to navigate to the left from the second block 308 to the first block 306, as indicated by arrow 316, resulting in the focus 118 being centrally located in the first block 306, e.g., on the 2 key. Alternatively, if the key that the user desires to select is located, for example, in the third block 310, the user may use a keyboard control input to navigate across blocks to the right, as indicated by arrow 318, resulting in the focus 118 being centrally located in the block 310, i.e. on the 8 key. After the user has navigated the focus 118 to a block 306, 308, 310 or 312 having a desired key, the user may use another navigation function, e.g., another type of keyboard control input, to navigate to the particular desired key.

Example Electronic Device

Figure 4:
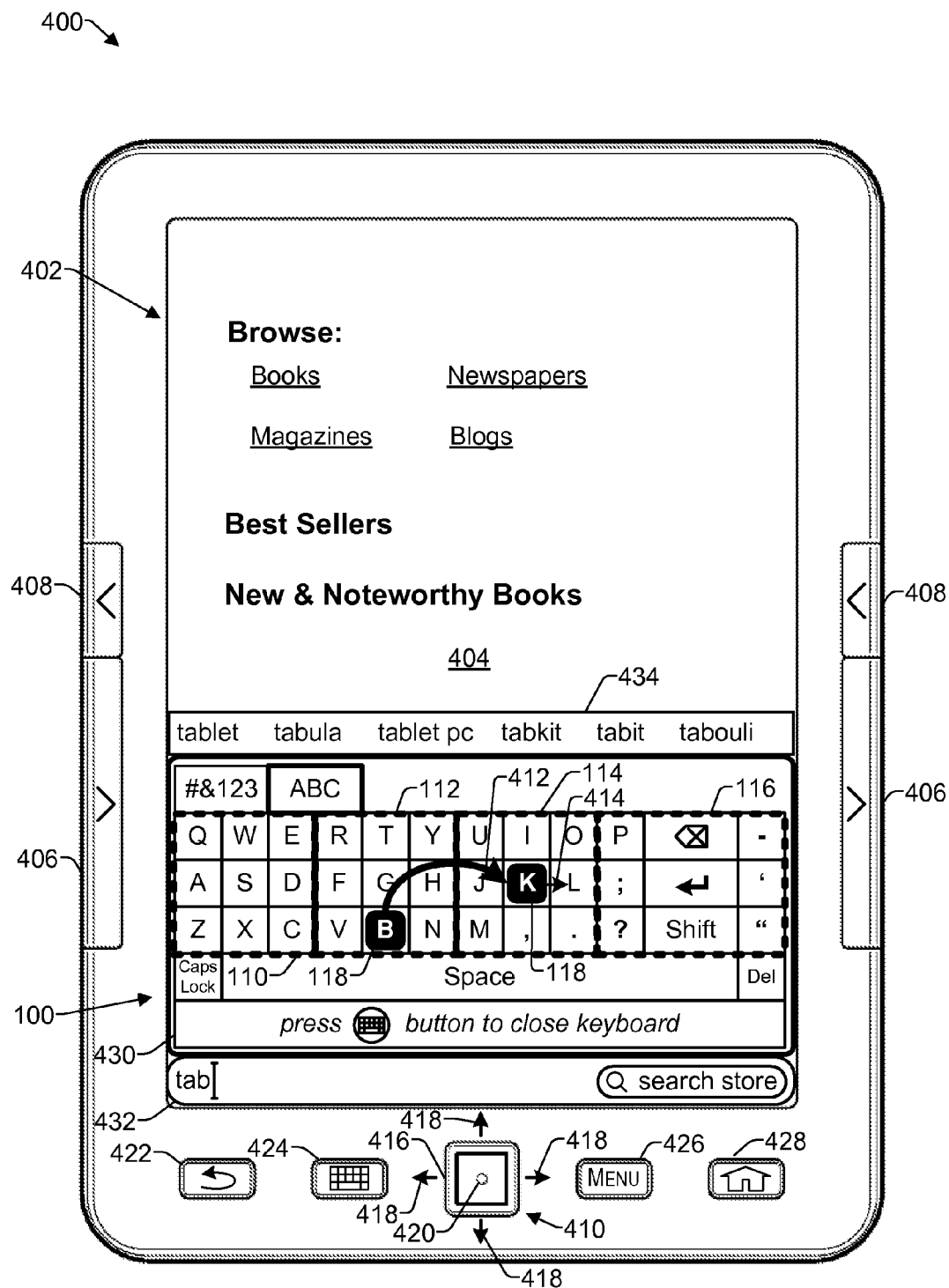
FIG. 4 illustrates an example electronic device incorporating techniques for navigating a virtual keyboard according to some implementations.

FIG. 4 depicts an example of an electronic device 400 that may display and enable navigation of the virtual keyboard 100 according to some implementations. In some instances, the electronic device 400 may be a portable or hand-held electronic device. In other instances, the electronic device 400 may be a fixed or generally non-portable device. In some instances, the electronic device may be controlled by a remote controller. Non-limiting examples of electronic devices 400 that may implement the virtual keyboard navigation techniques herein may include eBook readers, cellular phones, smart phones, portable media players, navigation devices, tablet computing devices, remotely controlled devices, such as televisions, game systems, set top boxes, optical disc players, digital video recorders, and so forth.

In the illustrated example, the electronic device 400 includes a display 402 configured to present information to a user. For example, when the electronic device 400 is used to perform a function, such as executing an application, consuming a content item, or the like, the display 402 may display an image 404 associated with the application, content item, etc. Numerous different types of images may be displayed in association with various functions, such still pictures, video or moving images, text, interactive buttons, virtual controls, and the like. Further, in some implementations, a portion of the displayed image 404 may be associated with one or more applications or content items, while another portion of the displayed image may be associated with an operating system of the electronic device 400. For example, certain virtual controls or image features may be displayed by the operating system, while other image features may be displayed by one or more applications or content items. Thus, implementations herein are not limited to use with a particular type of image. For example, the virtual keyboard 100 may be displayed by the operating system of the electronic device 400 or by an application executing on the electronic device 400.

In the illustrated example of FIG. 4, electronic device 400 may include a plurality of physical controls or buttons for controlling various features of the electronic device 400. In this example, the electronic device 400 includes one or more navigate-right controls 406, one or more navigate-left controls 408, and a five-way navigation control 410. For example, the navigate-right controls 406 and/or the navigate-left controls 408 may be used to navigate the focus 118 between blocks of keys, as described above. In some implementations, the navigate-right controls 406 and the navigate-left controls 408 may also perform other functions, depending on an application or content item that is currently active on the device 400. For example, in some implementations, the controls 406, 408 may serve as next-page and previous-page controls, respectively, forward and back controls, respectively, or the like.

The five-way control 410 may be used to navigate the focus among individual keys 104 of the keyboard 100. As an illustrative example, suppose that the focus 118 is currently located at the B key, and the user desires to select the L key next. The user may actuate the navigate-right control 406 to navigate the focus from the second block 112 to the third block 114, resulting in the focus moving from the B key to the K key, as indicated by arrow 412. The user may then actuate the five-way control 410 to move the focus from the K key to the L key, as indicated by the arrow 414. For example, the five-way control 410 may be a joystick-style control that includes an outer edge 416 that made be depressed in one of four directions as indicated by arrows 418. Accordingly, pressing the outer edge 416 of the five-way control 410 results in movement of the focus in the direction corresponding to the portion of the outer edge 416 being depressed. Furthermore, five-way control 410 also includes a center portion 420 that may be depressed in an inward direction to perform a selection function. When the focus 118 is positioned at a desired key in the keyboard 100, the user may depress the center portion 420 of the five-way control 410 to select the particular key at which the focus is currently located. Thus, in the illustrated implementation, the navigate-left controls 406 and the navigate-right controls 408 provide a first level of navigation granularity for navigation between blocks of the keys, while the five way control 410 provides a second level of navigation granularity for navigating between individual keys, and also enables selection of individual keys. It should be noted that controls 406, 408 and 410 described for carrying out the keyboard navigation herein are merely one non-limiting example of possible control configurations. Numerous other control configurations will be apparent to those of skill in the art in view of the disclosure herein.

The device 400 may include various other controls and features such as a back button 422, keyboard button 424, a menu button 426, and a home button 428. For instance, selection of the back button 422 may display a previously viewed screen or page. Selection of the keyboard button 424 may result in presentation of the keyboard 100 on the display 402. Pressing the keyboard button 424 again, may close the keyboard 100, as also indicated by the message 430 displayed below the keyboard 100 in FIG. 4. Selection of the menu button 426 may result in display of a contextual menu dialog such as may be presented by the operating system or one or more applications. Selection of the home button 428 may result in the presentation of a home or start screen.

In some implementations, the keyboard 100 may be associated with a text-entry box 432 and a suggested-word box 434. For example, as the user selects keys from the keyboard 100, the corresponding characters may appear in the text entry box 432. In addition, the device 400 may predict one or more words that the user may be attempting to enter into the text entry box based on the characters already entered and the current focus location. In the illustrated example, suppose that the user has entered the characters "tab" and the focus 118 is currently located over the B key following the entry of the "b" character into the text entry box 432. Next, the user moves the focus 118 to the adjacent third block 114 using the navigate-right control 406, as indicated by the arrow 412. The focus is then located over the K key as described above. Based on this navigation performed by the user, the suggested word box 434 displays a plurality of suggested words based on the possible selections of keys available in the third block 114. For example, because the user has navigated to the third block rather than the first block 110, the second block 112, or the fourth block 116, the device 400 may assume that the user intends to select one of the characters in the third block 114. Accordingly, the suggested words presented in the suggested word box 434 may be selected for presentation based on this assumption. Therefore, as the third block 114 includes the U key, the I key, the O key, the J key, the K key, the L key, the M key, the comma key, and the period key, the suggested words are selected based on one of these characters being the next character in the sequence of characters currently being entered into the text-entry box 432. Thus, according to these implementations, the suggested words presented in the suggested word box 434 would not include words having, as the fourth character, other letters contained in the other blocks 110, 112 or 116. In the illustrated example, the suggested words are "tablet," "tabula," "tablet PC," "tabkit," "tabit" and "tabouli," each of which includes, as a fourth character, one of the characters contained in the third block 114.

Figure 5:
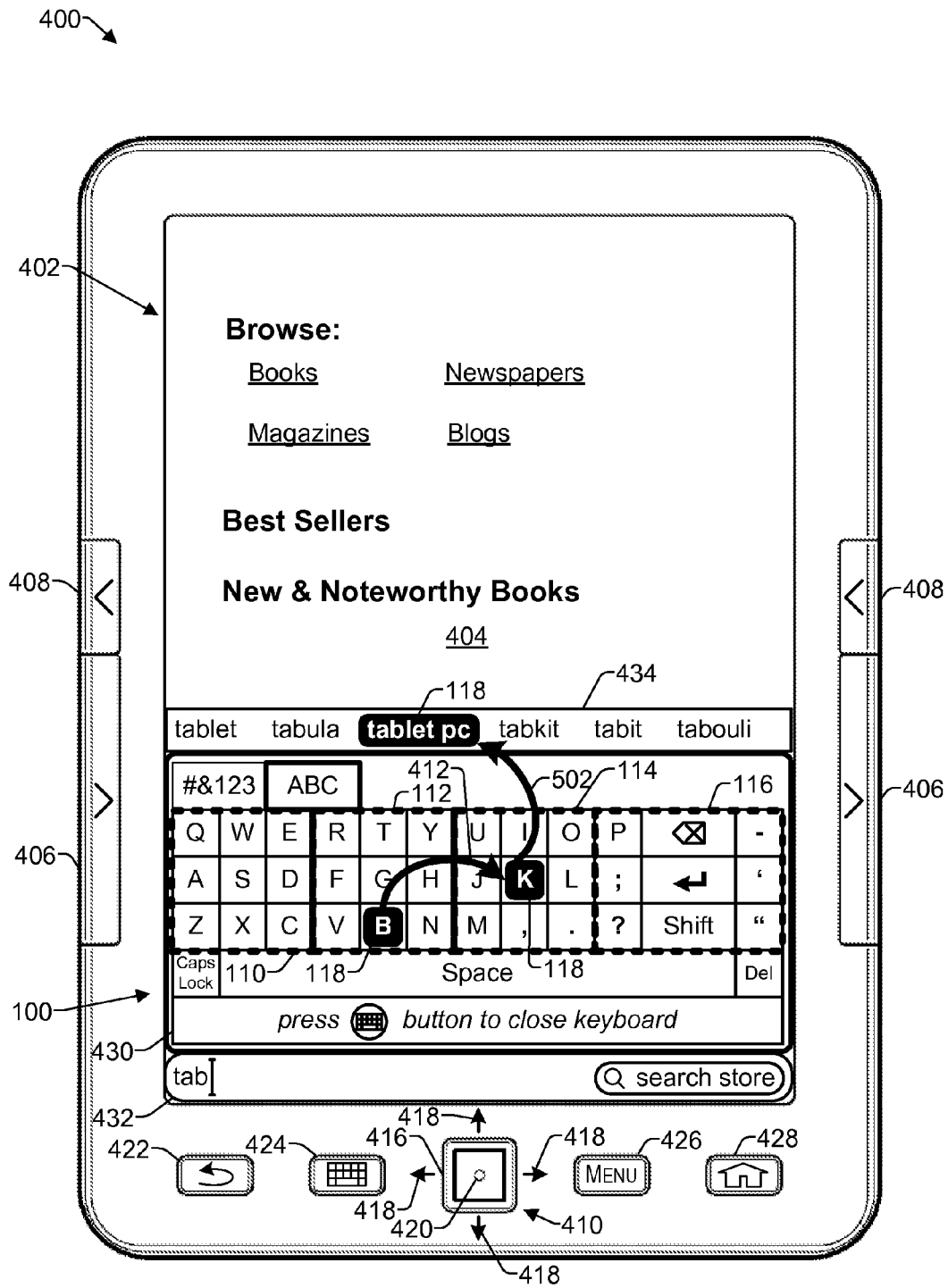
FIG. 5 illustrates the example electronic device of FIG. 4 including additional techniques for navigating a virtual keyboard according to some implementations.

In one illustrative example of use, as described with respect to FIG. 5, a user may activate a shopping function on the electronic device 400, resulting in the presentation of the image 404, which may include shopping and browsing information. Suppose for example, that the user is shopping for a book on tablet computers. The user has entered the characters "tab" into the text entry box 432, and then navigates the focus to the third block 114, as indicated by the arrow 412. This results in the presentation of one or more suggested words in the suggested word box 434. The user notices this and may navigate the focus 118 directly to the suggested word box 434, as indicated by the arrow 502. As one example, the user may hold down one of the navigate-right control 406 or the navigate-left control 408 in combination with pressing the outer edge 416 of the five-way control 410 to move in the upward direction to the suggested word box 434, as indicated by arrow 502. Alternatively, the user may repeatedly press the five-way control 410 in the up direction to navigate off the plurality of keys and into the suggested word box 434. The user may then use the five-way control 410 to select a particular suggested word, which in this case is "tablet pc." Following selection, the words "tablet pc" will appear in the text entry box 432. Additionally, in other implementations, the user may use the navigate-right controls 406 and navigate-left controls 408 to navigate left and right within the suggested words box 434.

Example Virtual Keyboard Layouts

Figure 6:
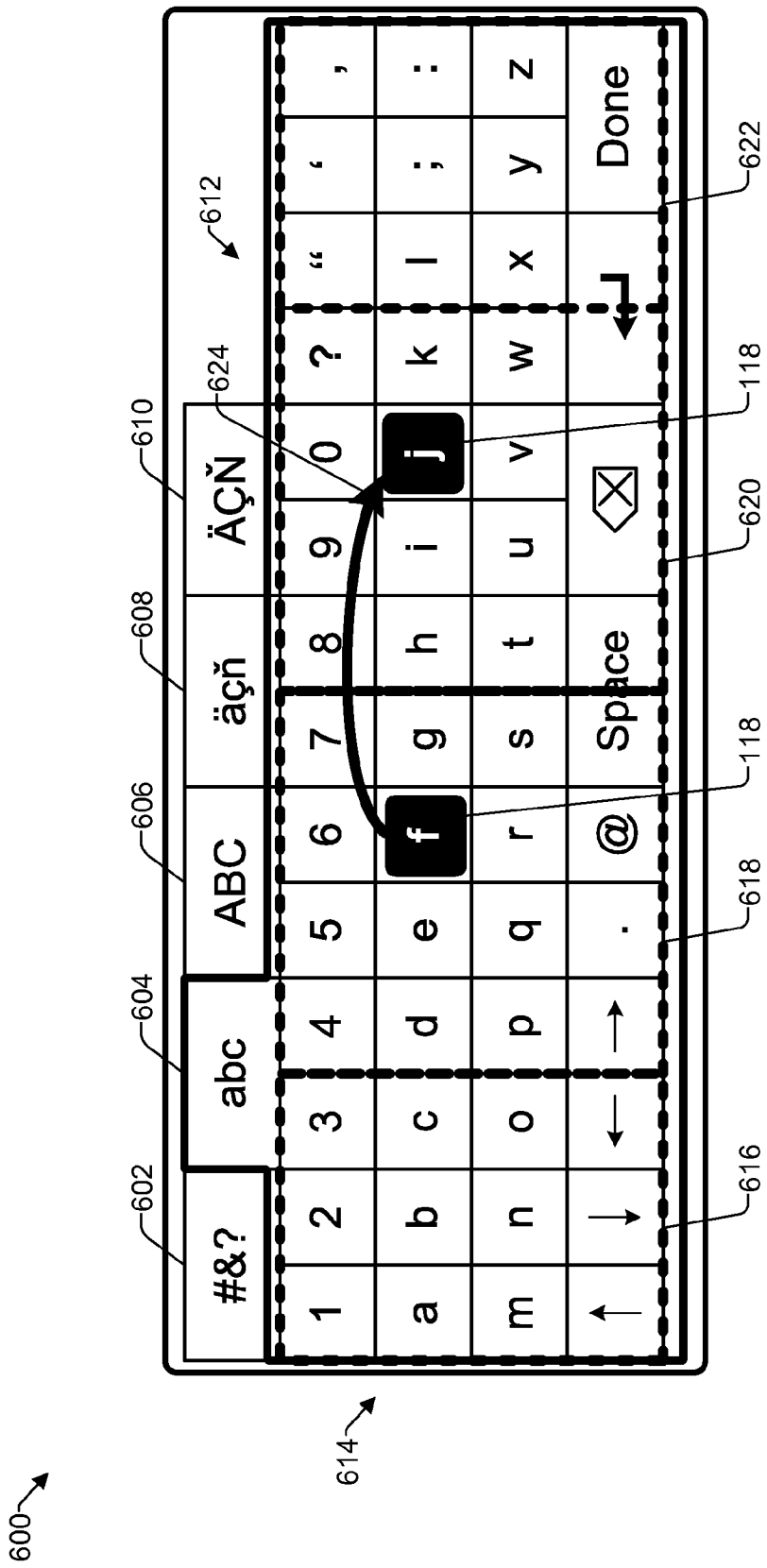
FIG. 6 illustrates an example of a layout of a virtual keyboard including foreign language characters according to some implementations.

FIG. 6 illustrates an example of a virtual keyboard 600 according to some implementations herein. The virtual keyboard 600 of FIG. 6 represents an alternative implementation to the keyboard 100 described above and includes five separate tabs 602-610 for presenting five different layouts in the keyboard 600 including foreign language characters. For example, a symbols tab 602 may be selected for presenting a layout of common symbols, a lowercase abc tab 604 may be selected for displaying a layout of lowercase English language letters, an uppercase ABC tab 606 may be selected for displaying a layout of uppercase English language letters, a lowercase foreign language tab 608 may be selected for displaying a layout of lowercase foreign language letters, and an uppercase foreign language tab 610 may be selected for displaying a layout of uppercase foreign language letters.

FIG. 6 illustrates a lowercase English language layout 612 including a plurality of keys 614 divided into multiple blocks including a first block 616, a second block 618, a third block 620, and a fourth block 622, as delineated by the bold dashed lines in FIG. 6. In this example, first block 616 includes 12 keys; second block 618 includes 15 keys plus one half of a spacebar key; third block 620 includes 12 keys plus the backspace key, one half of the spacebar key and one half of the return key; and the fourth block 622 includes nine keys plus a "done" key and one half of the return key. The "done" key may be selected when the user desires to close the keyboard 600. Thus, according to some implementations it is not necessary for the blocks 616-622 to be of the same size or contain the same number of keys. Further, the keys may be contained in more than one block or split between blocks.

Navigation between the blocks 616-622 may take place as described above, by using a first control to navigate between blocks and a second control to navigate among keys within a block. For example, when the tab 604 is initially selected, the focus 118 may appear in a central location such as the f key in the second block 618, or the i key in third block 620. In the illustrated example, suppose that the focus 118 is presented in the second block 618 at the f key, and that the user desires to navigate to the third block 620. The user may use the navigate right control 406, as described above, to navigate the focus 118 from the second block 618 to the third block 620, as indicated by arrow 624. Because both of the i key and the j key are centrally located in the third block 620, the focus 118 may be presented on either key. However according to some implementations, the focus is presented on the j key, rather than the i key, as the j key is further from the f key than the i key. This can improve efficiency by reducing the number of control actions required to navigate through the keyboard 600 to reach certain keys, such as the k key.

Figure 7A:
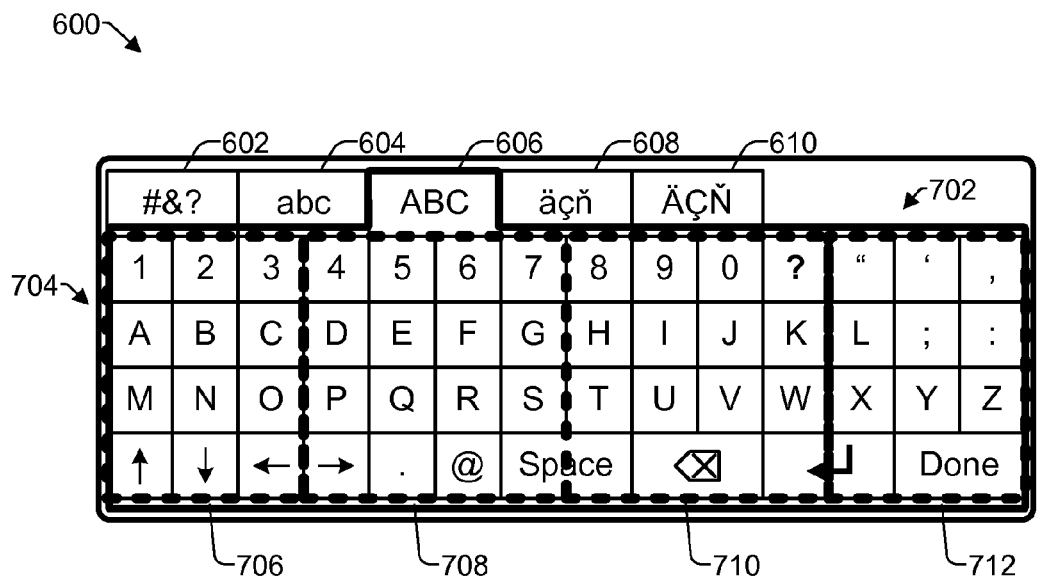
FIGS. 7A-7B illustrate examples of layouts of the virtual keyboard of FIG. 6 according to some implementations.

FIG. 7A illustrates an example layout 702 of keys 704 that is presented when the uppercase ABC tab 606 of the keyboard 600 is selected. In this example, the keys 704 are divided into four blocks including a first block 706, a second block 708, a third block 710, and a fourth block 712. The layout 702 of the keys 704 is similar to the layout 612 described above with respect to the lowercase abc tab 604 in FIG. 6. The navigation between the blocks 706, 708, 710 and 712 is also similar to that described above.

Figure 7B:
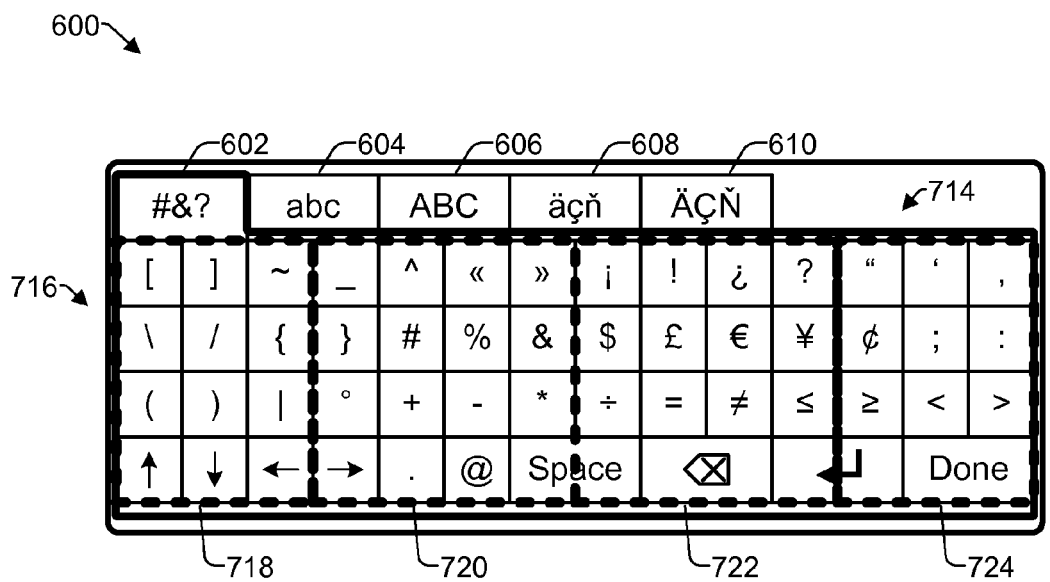

FIG. 7B illustrates an example layout 714 of keys 716 that is presented when the symbols tab 602 of the keyboard 600 is selected. In this example, the keys 716 are divided into four blocks including a first block 718, a second block 720, a third block 722, and a fourth block 724. The layout 714 of the keys 716 within each block 718-724 may be similar to the layout 612 described above with respect to the lowercase abc tab 604 in FIG. 6. The navigation between the blocks 718-724 is also similar to that described above.

Figure 8A:
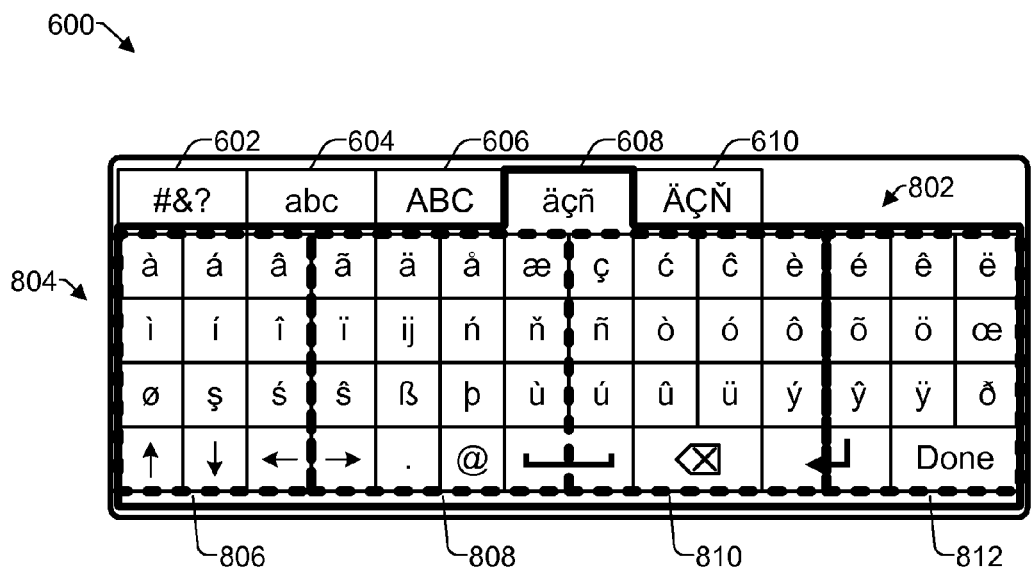
FIGS. 8A-8B illustrate examples of layouts of the virtual keyboard of FIG. 6 according to some implementations.

FIG. 8A illustrates an example layout 802 of keys 804 that is presented when the lowercase foreign language tab 608 of the keyboard 600 is selected. In this example, the keys 804 are divided into four blocks including a first block 806, a second block 808, a third block 810, and a fourth block 812. The layout 802 of the keys 804 within each block 806-812 may be similar to the layout 612 described above with respect to the lowercase abc tab 604 in FIG. 6. The navigation between the blocks 806-812 is also similar to that described above.

Figure 8B:
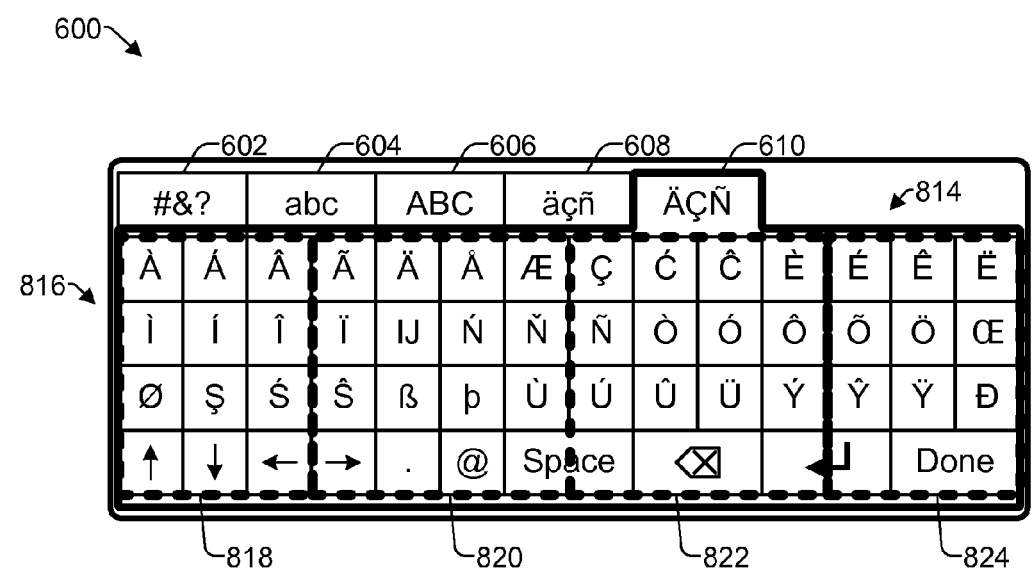

FIG. 8B illustrates an example layout 814 of keys 816 that is presented when the uppercase foreign language tab 608 of the keyboard 600 is selected. In this example, the keys 816 are divided into four blocks including a first block 818, a second block 820, a third block 822, and a fourth block 824. The layout 814 of the keys 816 within each block 818-824 may be similar to the layout 612 described above with respect to the lowercase abc tab 604 in FIG. 6. The navigation between the blocks 818-824 is also similar to that described above.

Figure 9A:
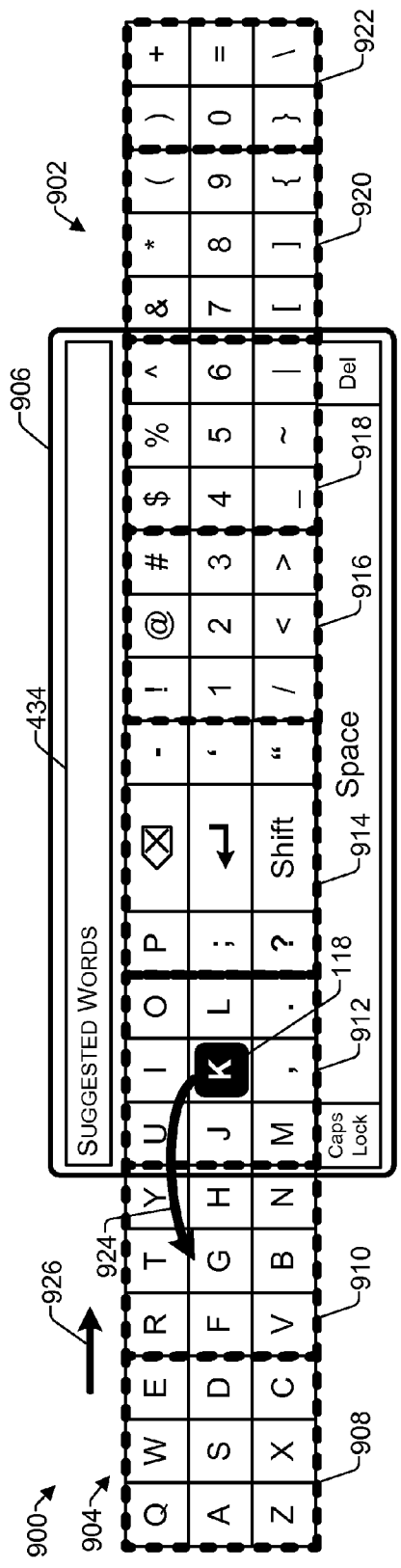

FIG. 9A illustrates an example of a contiguous virtual keyboard 900 according to some implementations herein. In the example of FIG. 9A, the tabs for selecting different layouts have been eliminated and instead a single layout 902 of a plurality of adjoining keys 904 is provided for presenting the keyboard 900. For example, the letter, symbol, number, and function keys may all be presented in the single contiguous layout 902, with only a certain predefined number of blocks being displayed within a keyboard field of view 906 at any particular time. In this example, the keys 904 may be divided into a plurality of adjoining blocks including a first block 908, a second block 910, a third block 912, a fourth block 914, a fifth block 916, a sixth block 918, a seventh block 920, and an eighth block 922. In this example, blocks 908-914 may correspond, respectively, to blocks 110-116 described above with respect to FIG. 2. Furthermore, blocks 916-920 may correspond, respectively, to blocks 306-310 described above with respect to FIG. 3. Additionally, eighth block 922 may generally correspond to block 312 described above with respect to FIG. 3 with the removal of the backspace key, the return key, and the shift key, as these keys are already included in block 914. When the keyboard 900 is displayed on the electronic device 400, a subset of the blocks 908-922 are displayed in the keyboard field of view 906 on the display 402 of the device 400. Furthermore, because the keyboard 900 includes a single layout, tabs are not used in this implementation. Further, the suggested words box 434 may be located adjacent to the plurality of keys 904, enabling navigation directly from the plurality of keys 904 to the suggested words box 434.

In the example illustrated in FIG. 9A, the focus 118 is currently located in third block 912 over the K key. Suppose, for example, that the user wishes to navigate to the left to second block 910, as indicated by arrow 924. Thus, upon activation of the navigate-left control 408, rather than navigating the focus 118 out of the keyboard field of view 906, the entire layout 902 is shifted to the right as indicated by arrow 926 resulting in the configuration illustrated in FIG. 9B.

Figure 9B:
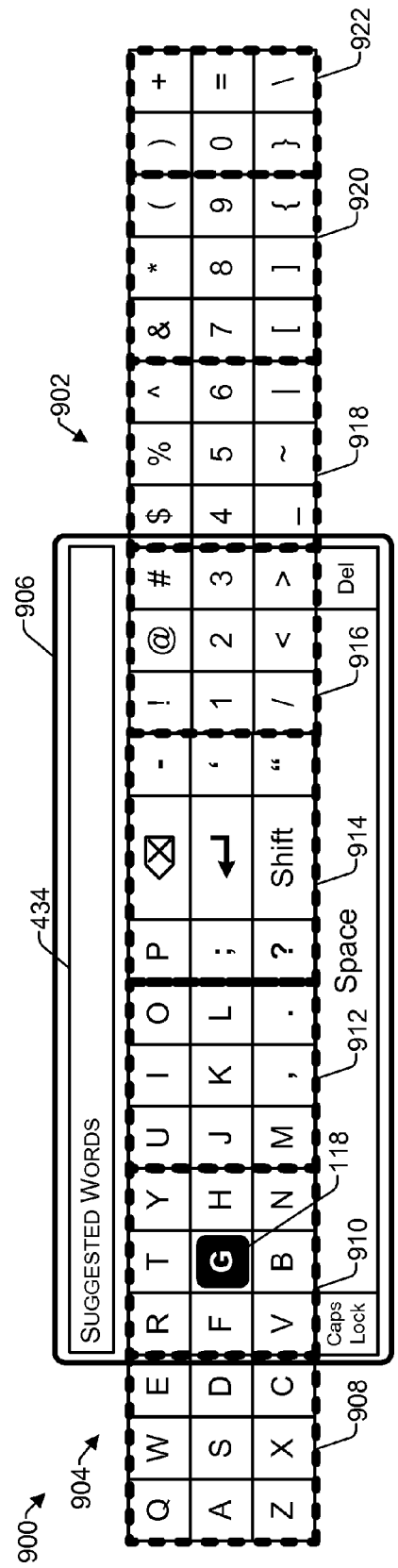

As illustrated in FIG. 9B, the layout 902 has been shifted to the right by one block, resulting in the focus 118 being positioned over the G key in the second block 910. Thus, second block 910 is now within the keyboard field of view 906, while the sixth block 918 has been moved outside of the keyboard field of view 906. Furthermore, in some implementations, the layout 902 may wrap around so that if the user continues to navigate to the left eventually the eighth block 922 will enter the keyboard field of view 906 from the left side.

Navigation of the focus 118 to the right may result in similar effects to those described above. For instance, in the example illustrated in FIG. 9B, the user may use the navigate-right control 406 to navigate from the second block 910 to the third block 912, to the fourth block 914 without any shifting of the layout 902. However, upon positioning the focus 118 in the fourth block 914, additional attempted navigation to the right will result in the layout 902 shifting to the left to maintain the focus within the keyboard field of view 906.

FIGS. 9C-9D illustrate an alternative arrangement of the keyboard 900 and layout 902 of FIGS. 9A-9B. In FIG. 9C, blocks 912, 914 and 916 are fully laid out in the keyboard field of view 906, and blocks 908, 910, 918, 920 and 922 are shown inside the keyboard field of view 906, but in a folded or stacked configuration. For example, the stacked blocks 908, 910, 918-922 may appear to be projected in a three-dimensional manner in a direction oblique to a plane of the keyboard 900. Further, while not fully illustrated in FIGS. 9C-9D, characters on the keys in the stacked blocks 908, 910, 918-922 may be at least partially visible to a user.

The number of stacked blocks shown on either side of the fully displayed blocks 912, 914 and 916 reflects how far the user can navigate in a particular direction. In the example illustrated in FIG. 9C, the focus 118 is currently located in third block 912 over the K key. Suppose, for example, that the user wishes to navigate to the left to the second block 910, as indicated by arrow 928. Thus, upon activation of the navigate-left control 408, the entire layout 902 is shifted to the right, as indicated by arrow 930, resulting in the configuration illustrated in FIG. 9D.

As illustrated in FIG. 9D, the layout 902 has been shifted to the right by one block, resulting in the focus 118 being positioned over the G key in the second block 910. Thus, second block 910 is now fully displayed within the keyboard field of view 906, while the sixth block 918 has added to the stacked blocks 918-922 on the right side of the keyboard 900. Navigation of the focus 118 to the right may result in similar effects to those described above. For instance, in the example illustrated in FIG. 9D, the user may use the navigate-right control 406 to navigate from the second block 910 to the third block 912, to the fourth block 914 without any shifting of the layout 902. However, additional attempted navigation to the right will result in the layout 902 shifting to the left, and the movement of block 916 back into the fully displayed configuration, so as to maintain the focus 118 within the keyboard field of view 906.

In an additional variation, the arrangements of the keys and the blocks may be dynamically adjusted based on observed user habits. For example, the electronic device 400 may track which keys are selected by the user most often, and may present a keyboard layout in which the keys and blocks are arranged based on the most-frequently used keys. Referring to FIG. 9A as an example, when the keyboard is activated, blocks 912, 914, 916 and 918 may be presented in the keyboard field of view 906. In some implementations, the blocks 912, 914, 916 and 918 may include those keys that have historically been used most frequently by the particular user. For example, the most frequently used keys may be presented in the two central blocks, i.e., blocks 914 and 916 in this example. Further, the most-frequently used key may be centrally located, for example, in the center of block 914, and the keyboard focus 118 may start on that key when the keyboard is opened. Less-frequently used keys may be located in blocks not initially presented in the keyboard field of view 906, such as blocks 908, 910, 920 and 922. As the user continues to use the keyboard 900, the locations of the keys may continue to be dynamically refined based on how frequently the user selects the keys. This variation may also be applied to the other keyboards and layouts described herein. Furthermore, numerous other variations will be apparent to those of skill in the art in light of the disclosure herein.

Example Electronic Device Components

Figure 10:
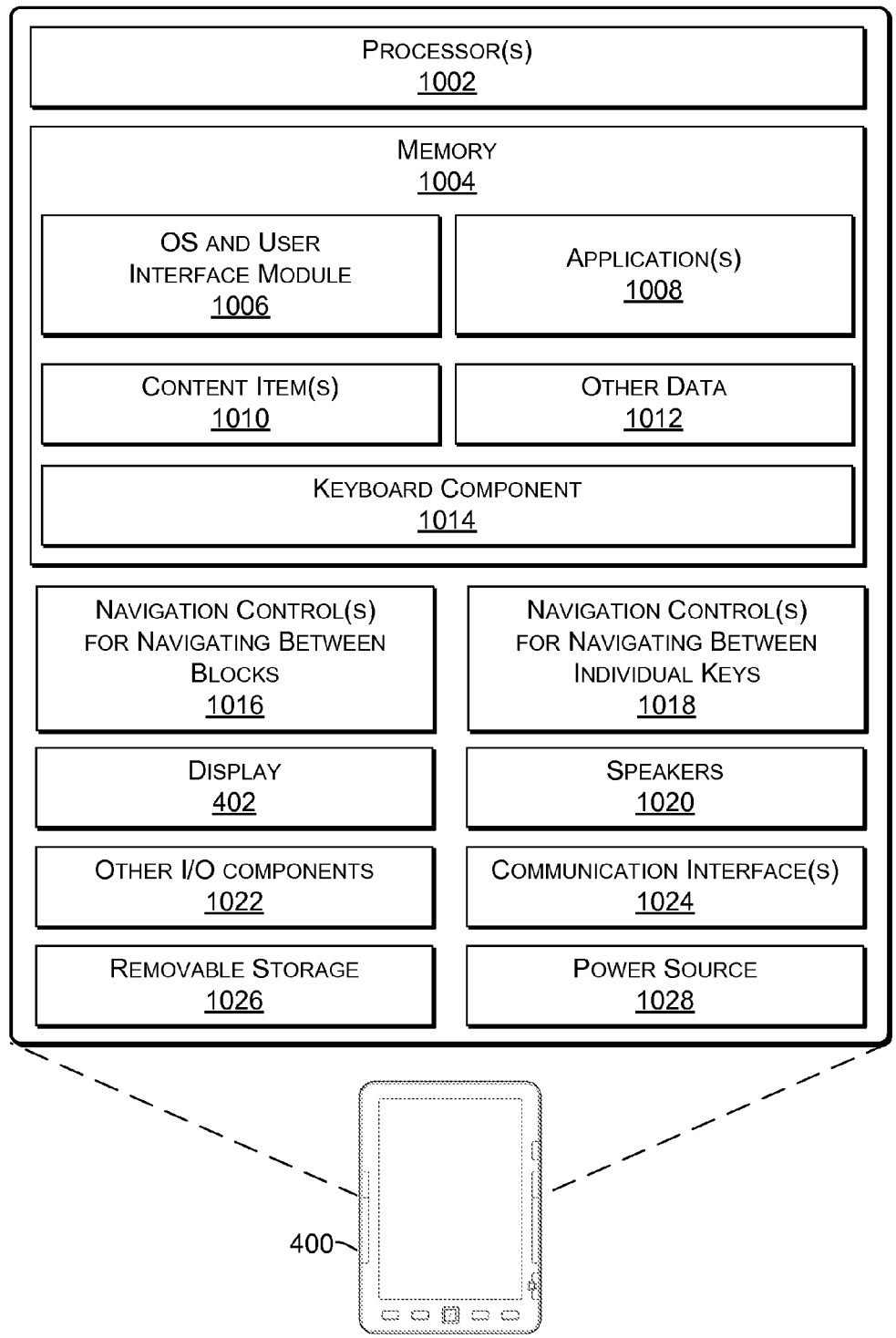
FIG. 10 is a block diagram illustrating selected example modules and components of an electronic device able to provide and navigate a virtual keyboard.

FIG. 10 is a block diagram 1000 of select example components of the electronic device 400 according to some implementations. In a very basic configuration, the electronic device 400 includes or accesses components such as at least one processor 1002 and a memory 1004. Each processor 1002 may itself comprise one or more processors or cores. Depending on the configuration of the electronic device 400, the memory 1004 may be an example of non-transitory computer-readable media and may include volatile and nonvolatile memory, mass storage, or the like. For instance, the memory 1004 may include, but is not limited to, RAM, ROM, EEPROM, flash memory, solid-state drives, magnetic disks, or other memory or storage technology. Thus, the memory 1004 may include any medium that can be used to record or store computer-readable instructions and data that can be accessed by the electronic device 400.

The memory 1004 may store any number of functional components that are executable on the processor 1002, as well as data and content items that are used or rendered by the electronic device 400. Thus, the memory 1004 may store an operating system (OS) and user interface module 1006 that is executable by the processor 1002. For example, the operating system may include a kernel operatively coupled to one or more device drivers and may provide a user interface for enabling a user to access functions and features of the electronic device 400. One feature of the OS and user interface module 1006 allows a user to activate a virtual keyboard, such as keyboards 100, 600 or 900, for presentation on the display 402 of the electronic device 400. For example, in some implementations, a user may cause the keyboard to be presented by activating the keyboard button 424 described above.

The OS and user interface module 1006 may allow a user to execute one or more applications 1008 and/or consume one or more content items 1010. For instance, a user may execute one or more applications 1008 for performing various functions with the device 400. The applications 1008 may include a browser or other application that facilitates access to sites over a network, such as websites or online merchants. The applications 1008 may also include one or more content presentation application(s) 1008 for rendering the content items 1010. Examples of such applications may include an electronic book reader application for rendering electronic books, images, etc., an audio player for playing audio books or songs, a video player for playing video, and so forth. Thus, the memory 1004 may store one or more content items 1010, such as eBooks, audio books, songs, videos, still images, and the like. Additionally, for example, the OS and user interface module 1006 may allow the user to search for available content items 1010 for selecting a particular content item 1010 to consume, such as by receiving, downloading, displaying, playing, or the like. The OS and user interface module 1006 may facilitate textual entry of a selection through use of the virtual keyboards described herein, or by other means, such as audible entry of a selection (e.g., via a microphone), or entry of a selection in any other manner. The OS and user interface module 1006 may provide menus, program guides and other navigational tools to facilitate selection and rendering of one or more content items 1010. The memory 1004 may also store other data 1012, such as other executable programs and associated data, databases, user settings, configuration files, device status, and so forth.

FIG. 10 further illustrates that the memory 1004 stores a keyboard component 1014 that is executable on the processor 1002 to present and navigate a virtual keyboard as described above with reference to FIGS. 1-9. In some implementations, the keyboard component 1014 may be part of the operating system and user interface 1006, while in other implementations, the keyboard component 1014 may be a separate module or part of one or more applications 1008. Keyboard component 1014 may generate, present and provide functionality for a virtual keyboard, as described above, which includes navigable blocks of keys.

FIG. 10 further illustrates one or more navigation control(s) 1016 for navigating between blocks of keys of a virtual keyboard. For example, the one or more navigation controls 1016 may include the navigate-right controls 406 and the navigate-left controls 408, as described above. Alternatively, one or more other controls may be provided for navigating between blocks of keys. Further, as described below, in some implementations, a remote controller may include the one or more navigation controls 1016 for navigating between blocks of keys.

FIG. 10 also illustrates one or more navigation controls 1018 for navigating between individual keys of a virtual keyboard. For example, one or more navigation controls 1018 may include the five-way control 410 described above with respect to FIG. 4. Alternatively, one or more other controls may be provided for navigating between individual keys. Further, the one or more navigation controls 1018 may include a control for selecting a particular key following completion of navigation, such as is provided by the five-way control 410 described above. Alternatively, a separate control may be provided for performing the key selecting function. Further, as described below, in some implementations, a remote controller may include the one or more navigation controls 1018 for navigating between individual keys and for performing a selecting function.

FIG. 10 further illustrates the display 402, which may be passive, emissive or any other form of display. In one implementation, the display uses electronic paper (ePaper) display technology, which is bi-stable, meaning that it is capable of holding text or other rendered images even when very little or no power is supplied to the display. Some examples of suitable ePaper displays that may be used with the implementations described herein include bi-stable LCDs, MEMS, cholesteric, pigmented electrophoretic, and others. In other implementations, or for other types of devices, the display 402 may be an active display such as a liquid crystal display, plasma display, light emitting diode display, organic light emitting diode display, and so forth. These displays may comprise drive electronics, such as a display drive matrix configured to affect individual pixels within the display 402. In some implementations, the display 402 may be a 3D display capable of providing a 3D image. For example, the display 402 may produce a 3D image by providing alternating left-eye and right-eye images with or without the use of shuttering or filtering eyeglasses.

In some implementations, multiple displays 402 may be present on the electronic device 400. When multiple displays are present, these displays may be of the same or different types. For example, one display may be an electrophoretic display while another may be a liquid crystal display. For convenience only, the display 402 is shown in a generally rectangular configuration. However, it is understood that the display 402 may be implemented in any shape, and may have any ratio of height to width.

The electronic device 400 may further be equipped with speakers 1020 and various other input/output (I/O) components 1022. Audio output may be provided through one or more audio speakers 1020. For example, audio output from one or more content items 1010 or applications 1008 may be provided through speakers 1020. Further, the OS and user interface module 1006 may also provide audio output through speakers 1020 based on various interface functions.

Other I/O components 1022 may include various user actuable controls (e.g., buttons 422-428 discussed above), a microphone, a camera, connection ports, and so forth. For example, the operating system and user interface module 1006 of the electronic device 400 may include suitable drivers configured to accept input from user actuable controls and devices included as the I/O components 1022. For instance, the user actuatable controls may include page turning buttons, the navigational keys, a power on/off button, selection keys, and so on, as discussed above.

A communication interface 1024 may support both wired and wireless connection to various networks, such as cellular networks, radio, WiFi networks, short-range or near-field networks (e.g., Bluetooth®), infrared signals, and so forth. The communication interface 1024 may allow a user of the electronic device 400 to download content items 1010 from a content item service, such as a from a website or other online service. The communication interface 1024 may further allow a user to access storage on another device, such as a user's computing device, a network attached storage (NAS) device, or the like.

Additionally, the electronic device 400 may include removable storage 1026. Examples of removable storage 1026 include flash memory and memory cards such as secure digital (SD) cards, mini SD cards, micro SD cards, SD high capacity (SDHC) cards, universal serial bus (USB) storage devices, and other removable storage devices and media.

The electronic device 400 may also include a power source 212, such as a battery and power control unit. The power source 212 may operatively control an amount of power, or electrical energy, consumed by the electronic device. Actively controlling the amount of power consumed by the electronic device 400 may achieve more efficient use of electrical energy stored by the power source 212.

The electronic device 400 may have additional features or functionality not illustrated. For example, the electronic device 400 may also include a hard drive using magnetic, optical, or solid-state storage to store information, various interfaces or ports supporting various protocols, a global positioning system (GPS) device, a PC Card component, a projector, peripheral components, and so forth.

Various instructions, methods and techniques described herein may be considered in the general context of computer-executable instructions, such as program modules stored on computer-readable media, e.g., memory 1004, and executed by the processor 1002. Generally, program modules include routines, programs, objects, components, data structures, etc. for performing particular tasks or implementing particular abstract data types. These program modules, and the like, may be executed as native code or may be downloaded and executed, such as in a virtual machine or other just-in-time compilation execution environment. Typically, the functionality of the program modules may be combined or distributed as desired in various implementations. An implementation of these modules and techniques may be stored on computer storage media or transmitted across some form of communication media. Further, the example electronic device 400 illustrated in FIG. 10 is just one non-limiting example of a suitable electronic device according to some implementations. Numerous other implementations, variations and configurations will be apparent to those of skill in the art in view of the disclosure herein.

Figure 11:
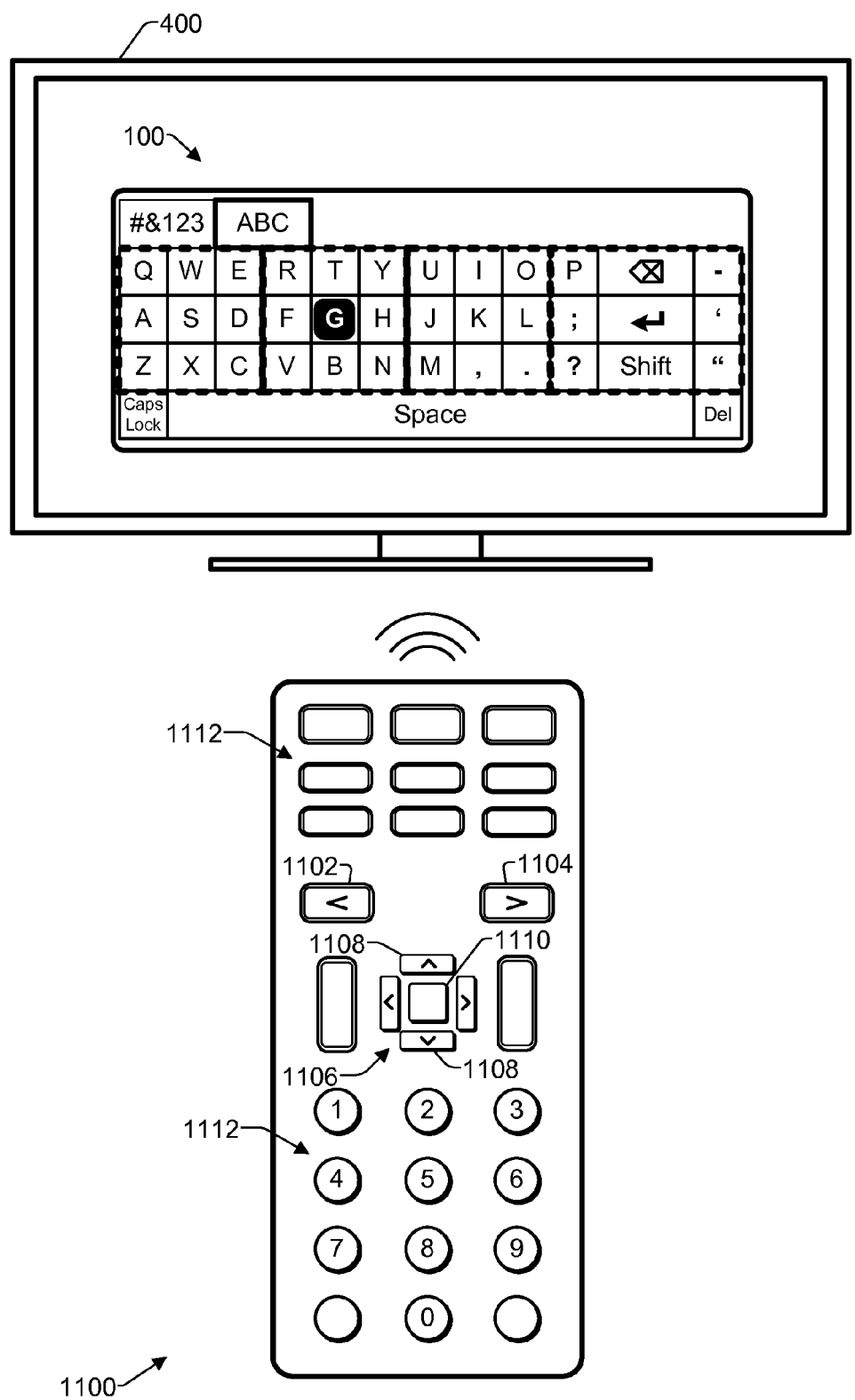
FIG. 11 illustrates an example of a remotely controlled electronic device according to some implementations.

FIG. 11 illustrates an example in which a remote controller 1100 is provided for navigating the virtual keyboards herein, such as the virtual keyboard 100. In the example, of FIG. 11, the electronic device 400 may include a television, display, monitor, or the like configured to display the virtual keyboard 100. In some implementations, a set top box, a game console, a digital video recorder, an optical disk player, or the like (not shown), may be included as the device 400 that presents the virtual keyboard 100. The remote controller 1110 may include a navigate-left control 1102 and a navigate-right control 1104 that may function in a similar manner to the navigate-left controls 408 and the navigate-right controls 406, respectively, described above. The remote controller 1100 may further include a five-way control 1106 that may include up, down, left and right buttons 1108 and a select button 1110, that may function in a manner similar to the five-way control 410 described above. Consequently, the navigate-left control 1102 and/or the navigate right control 1104 may be used to navigate between blocks of keys in the virtual keyboard 100, while the five-way control 106 may be used to navigate among and select individual keys, in the fashion described above. The remote controller may include various other controls and buttons 1112 for performing other functions, as is conventional in the art.

Example Process

Figure 12:
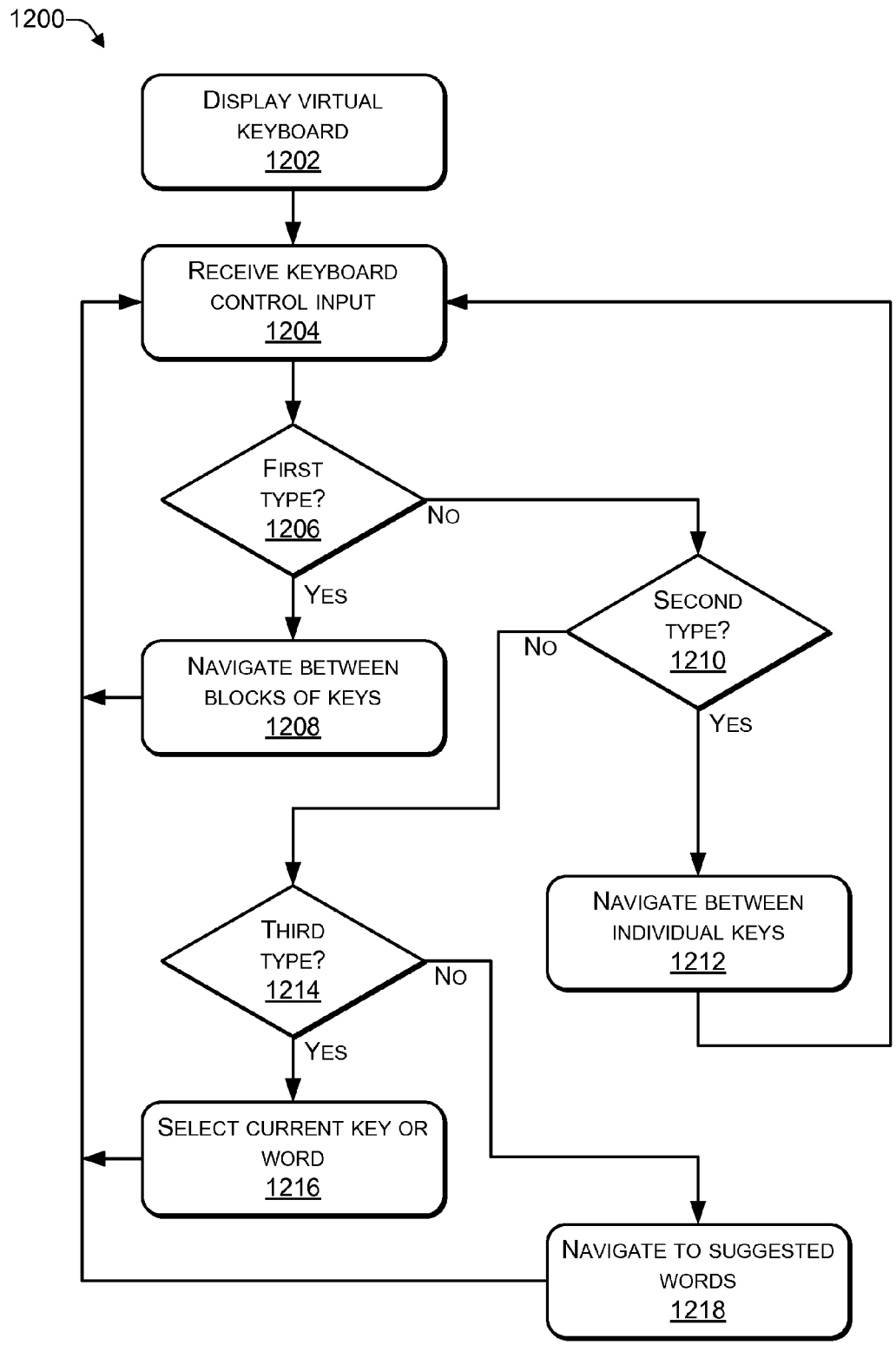
FIG. 12 is a flow diagram illustrating an example process of virtual keyboard navigation according to some implementations.

FIG. 12 illustrates an example process 1200 for implementing the techniques described above for navigating virtual keyboards. This process is illustrated as a logical flow diagram, each operation of which represents a sequence of operations that can be implemented in hardware, software, or a combination thereof. In the context of software, the operations represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. The process 1200 is described with reference to the virtual keyboards and electronic devices of FIGS. 1-11, although other virtual keyboards, electronic devices, architectures and systems may implement this process.

At block 1202, the electronic device 400 displays a virtual keyboard. For example, the operating system, an application, or the user may cause the electronic device to present a virtual keyboard, such as the virtual keyboard 100, 600 or 900 described above.

At block 1204, the device 400 receives a keyboard control input. For example, the control input may be received from one or more controls of the device, such as a navigate-right control, a navigate-left control or a five-way control. In some implementations, the control input may be received from a remote controller.

At block 1206, the electronic device determines whether the control input is of a first type. For example, the first type of control input may be received as a result of user activation of the navigate-left control or the navigate-right control. Thus, the first type of control input may correspond to an instruction to navigate between blocks of keys.

At block 1208, when the electronic device determines that the control input is of the first type, the electronic device performs navigation between blocks of keys. For example, the virtual keyboard may be divided into a plurality of blocks of keys, and upon receipt of the keyboard control input of the first type, the electronic device may navigate a focus of the keyboard from one block to an adjacent block. Further, in some implementations, the navigation may position the focus on a key that is centrally located within the adjacent block that is the target of the block-to-block navigation.

At block 1210, the electronic device determines whether the control input is of a second type. For example, the second type of control input may be received as a result of user activation of the outer edge of the five-way control, and may correspond to navigation of the focus in a desired direction between individual keys.

At block 1212, when the electronic device determines that the control input is of the second type, the electronic device performs navigation of the focus between individual keys. For example, upon receipt of the keyboard control input of the second type, the electronic device may navigate the focus of the keyboard to an adjacent key in the direction indicated by the control input.

At block 1214, the electronic device determines whether the control input is of a third type. For example, the third type of control input may be received in response to a user depressing a selection control, such as by depressing the center portion of the five-way key.

At block 1216, when the electronic device determines that the control input is of the third type, the electronic device selects the key at which the keyboard focus is currently located as an input. For example, when the keyboard focus is located over a character key, the corresponding character is selected as an input. When the keyboard focus is located over a function key, the corresponding function is selected as an input. Additionally, in implementations in which suggested words are provided, when the focus is located over a suggested word, the suggested word is selected as an input.

At block 1218, when the electronic device determines that the control input is not of the third type, then the control input may be of a fourth type, and may correspond to navigation to or from the suggested words box 434. For example, various combinations of controls may be used to execute the fourth type of control input, such as by a user holding down the navigate-left control or the navigate-right control while contemporaneously depressing the five-way key in the upward direction. Alternatively, navigation using, for example, the five-way control in the upward direction off the top row of keys may result in navigation to the suggested word box 434. Still alternatively, a dedicated control button may be provided for navigating between the plurality of keys and the suggested words.

In response to receiving the fourth type of keyboard control input, the electronic device may perform navigation from the plurality of keys to the one or more suggested words. For example, upon receipt of keyboard control input of the fourth type, the electronic device may move the focus of the keyboard to one of the words in the suggested words box 434. Further, in the case in which there are multiple suggested words, the user may navigate the focus between the suggested words in the suggested word box using, for example, navigation control inputs of the first type or the second type. Additionally, the user may select a suggested word using the keyboard control input of the third type when the keyboard focus is located over a desired suggested word.

The example process 1200 of FIG. 12 may be a continual process, such that as subsequent control inputs are received additional keyboard functions are performed until such a time as the virtual keyboard is closed. Further, the process 1200 is just one example process for discussion purposes. Numerous other variations will be apparent to those of skill in the art in light of the disclosure herein. Additionally, the techniques and arrangements herein may be applied for navigating other multi-part virtual representations of selectable elements, in addition to virtual keyboards. Thus, implementations herein are not limited to navigating virtual keyboards. Further, while the disclosure herein sets forth several examples of use of virtual keyboard navigation for discussion purposes, implementations herein are not limited to any particular device, purpose or intended use.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The invention claimed is:

1. A device comprising:
a display;
one or more processors operatively coupled to the display;
a keyboard component executed on the one or more processors for presenting a virtual keyboard on the display, the virtual keyboard including a plurality of selectable keys, the keys being grouped into a plurality of contiguous blocks, each block including a plurality of adjacently positioned keys;
a first control separate from the display, the first control activatable for producing a first type of keyboard control input for navigating a focus between a key of a first block of the plurality of contiguous blocks to a centrally located key of a second block of the plurality of contiguous blocks; and
a second control, separate from the display and the first control, the second control activatable for producing a second type of keyboard control input for navigating the focus between individual keys of the blocks;
wherein the keyboard component is configured to present one or more suggested words based, at least in part, on the plurality of selectable keys contained in a particular block in which the focus is currently located.

2. The device as recited in claim 1, further comprising a third control separate from the display and the first control, the third control activatable for producing a third type of keyboard control input for selecting a particular key from the virtual keyboard.

3. The device as recited in claim 1, wherein the keyboard component is further configured to present one or more suggested words based, at least in part, on one or more keys previously selected from the virtual keyboard.

4. The device as recited in claim 1, wherein, in response to a fourth type of keyboard control input, the keyboard component is configured to move the focus of the virtual keyboard between the plurality of keys and the one or more suggested words.

5. The device as recited in claim 4, wherein the fourth type of keyboard control input is produced using the first control in combination with the second control.

6. The device as recited in claim 1, wherein the blocks divide the plurality of keys into multiple groups of multiple keys presented in a field of view of the virtual keyboard.

7. The device as recited in claim 6, wherein the blocks in the field of view are visually distinguished from each other by at least one of: outlining; different coloration; or highlighting.

8. The device as recited in claim 1, wherein:
the virtual keyboard includes a key representing a spacebar; and
the key representing the spacebar extends across multiple blocks of the plurality of contiguous blocks.

9. The device as recited in claim 8, wherein the key representing the spacebar extends into contact with each block of the plurality of contiguous blocks visible in a field of view of the virtual keyboard.

10. The device as recited in claim 1, wherein the virtual keyboard includes multiple layouts, each layout being divided into multiple contiguous blocks of keys, each layout being selectable for presentation on the display by selection of a corresponding tab of multiple tabs presented with the plurality of keys.

11. The device as recited in claim 1, further comprising a remote controller including at least the first control and the second control for providing at least the first type of keyboard control input and the second type of keyboard control input, respectively, for remotely navigating the focus of the virtual keyboard presented on the display.

12. The device as recited in claim 1, wherein:
the first control comprises at least one first physical button on the device; and
the second control comprises at least one second physical button on the device.

13. A method comprising:
under control of an electronic device including a non-transitory computer-readable medium configured with specific computer-readable instructions,
presenting a keyboard on a display, the keyboard including a plurality of keys, the plurality of keys divided into multiple blocks comprising multiple keys, the multiple blocks being presented in a keyboard field of view; and
navigating a focus of the keyboard from a first block of the multiple blocks to a second block of the multiple blocks at least partly in response to a first type of keyboard control input received from a first physical control separate from the display;
navigating the focus of the keyboard from a first key in the second block to an adjacent key in response to a second type of keyboard control input received from a second physical control different from the first physical control;
navigating the focus of the keyboard from the adjacent key to one or more suggested words in response to a third type of keyboard control input received from the at least one of the first or second physical controls, wherein each of the one or more suggested words corresponds to one or more items for acquisition; and
activating a browsing function to allow for acquisition of at least one of the one or more items in response to a fourth type of keyboard control input received from a combination of the first physical control and the second physical control.

14. The method as recited in claim 13, wherein the keyboard includes a key representing a spacebar extending across multiple blocks, the method further comprising navigating the focus of the keyboard from a current key to the spacebar in response to the second type of keyboard control input.

15. The method as recited in claim 13, further comprising, in response to receiving a keyboard control input of a fourth type from the second physical control, selecting as an input to a user interface of the device, an individual key at which the focus of the keyboard is currently located.

16. The method as recited in claim 13, wherein the navigating the focus of the keyboard from the first block to the second block results in the focus being positioned on a key that is centrally located in the second block.

17. The method as recited in claim 13, wherein the one or more suggested words are presented on the display based, at least in part, on one or more keys previously selected from the keyboard.

18. The method as recited in claim 13, wherein the one or more suggested words are presented on the display based, at least in part, on one or more keys contained in a particular block in which the focus of the keyboard is currently located.

19. The method as recited in claim 13, wherein a first subset of the multiple blocks is presented in the keyboard field of view and a second subset of the multiple blocks is outside of the keyboard field of view, the method further comprising, when the second block is outside of the keyboard field of view, moving the second block into the keyboard field of view in response to the keyboard control input of the first type received from the at least of the first or second physical controls.

20. One or more non-transitory computer-readable media maintaining computer-readable instructions executable by one or more processors to perform operations comprising:
dividing a virtual keyboard having a plurality of keys into a plurality of blocks, the blocks each including multiple contiguous keys;
presenting, on a display, in a keyboard field of view, at least some of the plurality of blocks;
navigating a focus of the virtual keyboard from a first block of the plurality of blocks in the keyboard field of view to a second block of the plurality of blocks at least partly in response to a first type of keyboard control input received from at least one control that is separate from the display, wherein the navigating the focus from the first block to the second block causes the focus to transition from a key in the first block to a centrally located key in the second block; and
presenting, on the display, one or more suggested words based at least in part on the plurality of keys in the second block of the plurality of blocks.

21. The one or more non-transitory computer-readable media as recited in claim 20, wherein the keyboard control input is a first type of keyboard control input, the operations further comprising navigating the focus of the virtual keyboard from a first key to an adjacent key in response to a second type of keyboard control input received from the at least one control that is separate from the display.

22. The one or more non-transitory computer-readable media as recited in claim 20, wherein dividing the virtual keyboard into a plurality of blocks further comprises arranging the keys in the plurality of blocks based, at least in part, on a determined frequency at which the keys have previously been selected by a user.

23. The one or more non-transitory computer-readable media as recited in claim 20, wherein a first subset of the plurality of blocks is presented in the keyboard field of view and a second subset of the plurality of blocks is outside of the keyboard field of view, the operations further comprising, when the second block is outside of the keyboard field of view, moving the second block into the keyboard field of view in response to the keyboard control input.

24. The one or more non-transitory computer-readable media as recited in claim 20, wherein a first subset of the plurality of blocks is presented laid out in the keyboard field of view and a second subset of the plurality of blocks is displayed as stacked blocks on at least one side the first subset, the operations further comprising, when the second block is one of the stacked blocks, moving the second block into the first subset in response to the keyboard control input and adding a block from the first subset to the stacked blocks.

25. The one or more non-transitory computer-readable media as recited in claim 20, the operations further comprising selecting an individual key over which the focus is located in response to a third type of keyboard control input received from the at least one control that is separate from the display.

26. The one or more non-transitory computer-readable media as recited in claim 20, the operations further comprising selecting one of the one or more suggested words at least partly in response to a fourth type of keyboard control input received from the at least one control that is separate from the display, wherein the each of the one or more suggested words corresponds to an item for acquisition and the selection activates a browsing function to allow for acquisition of the item from an online merchant.

* * * * *